United States Patent
Ostromek et al.

(10) Patent No.: US 6,760,062 B2
(45) Date of Patent: Jul. 6, 2004

(54) SYNCHRONIZING SUBSYSTEMS OF AN ELECTRO-OPTICAL SYSTEM

(75) Inventors: Timothy E. Ostromek, Richardson, TX (US); Antonio V. Bacarella, Dallas, TX (US)

(73) Assignee: Northrop Grumman Corporation, Los Angeles, CA (US)

( * ) Notice: Subject to any disclaimer, the term of this patent is extended or adjusted under 35 U.S.C. 154(b) by 104 days.

(21) Appl. No.: 10/154,565

(22) Filed: May 23, 2002

(65) Prior Publication Data

US 2003/0222986 A1 Dec. 4, 2003

(51) Int. Cl.[7] .............................................. H04N 5/232
(52) U.S. Cl. .............................. 348/211.11; 348/222.1; 348/217.1
(58) Field of Search .................... 348/207.99, 207.1, 348/211.99, 211.1, 211.3, 211.4, 211.11, 211.12, 211.14, 215.1, 216.1, 217.1, 222.1, 143, 157, 159, 500, 510, 521, 552, 14.01, 14.05, 14.08; 702/132; 340/870.11

(56) References Cited

U.S. PATENT DOCUMENTS 6,047,248 A * 4/2000 Georgiou et al. ........... 702/132
6,330,025 B1 * 12/2001 Arazi et al. ................. 348/143
6,542,183 B1 * 4/2003 DeAngelis et al. .......... 348/157
6,657,553 B1 * 12/2003 Bergman et al. ........ 340/870.11

FOREIGN PATENT DOCUMENTS

JP         2000-115596      *  4/2000      .......... H04N/5/225

OTHER PUBLICATIONS

PCT "Internaltional Search Report", PCT/US03/114482.*

* cited by examiner

Primary Examiner—Tuan Ho
(74) Attorney, Agent, or Firm—Fulbright & Jaworski LLP

(57) ABSTRACT

Synchronizing subsystems includes receiving an objective and constraints at a timing module from a processor. The constraints describe subsystems that include at least one sensor. An objective function is determined in response to the objective. The objective function includes a function of time variables, where a time variable is associated with a subsystem. The objective function is optimized in accordance with the constraints to determine a time value for each time variable, and the subsystems are synchronized according to the time values. Data is received from the synchronized subsystems at the processor, and an image is generated from the data.

20 Claims, 1 Drawing Sheet

SYNCHRONIZING SUBSYSTEMS OF AN ELECTRO-OPTICAL SYSTEM

TECHNICAL FIELD OF THE INVENTION

This invention relates generally to the field of electro-optical systems and more specifically to synchronizing subsystems of an electro-optical system.

BACKGROUND OF THE INVENTION

Electro-optical devices may include subsystems that are used to generate an image of an object. Each subsystem may have its own internal clock that may need to be synchronized with the internal clocks of the other subsystems. Consequently, generating images using electro-optical devices has posed challenges.

SUMMARY OF THE INVENTION

In accordance with the present invention, disadvantages and problems associated with previously developed techniques are substantially eliminated or reduced.

According to one embodiment of the present invention, synchronizing subsystems includes receiving an objective and constraints at a timing module from a processor. The constraints describe subsystems that include at least one sensor. An objective function is determined in response to the objective. The objective function includes a function of time variables, where a time variable is associated with a subsystem. The objective function is optimized in accordance with the constraints to determine a time value for each time variable, and the subsystems are synchronized according to the time values. Data is received from the synchronized subsystems at the processor, and an image is generated from the data.

Certain embodiments of the invention may provide technical advantages. A technical advantage of one embodiment is a timing module that synchronizes subsystems of an electro-optical device. The timing module optimizes an objective function to synchronize the subsystems. Consequently, the timing module may optimize a feature of the electro-optical device while synchronizing the subsystems.

Other technical advantages are readily apparent to one skilled in the art from the following figures, descriptions and claims. Embodiments of the invention may include none, some, or all of the technical advantages.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
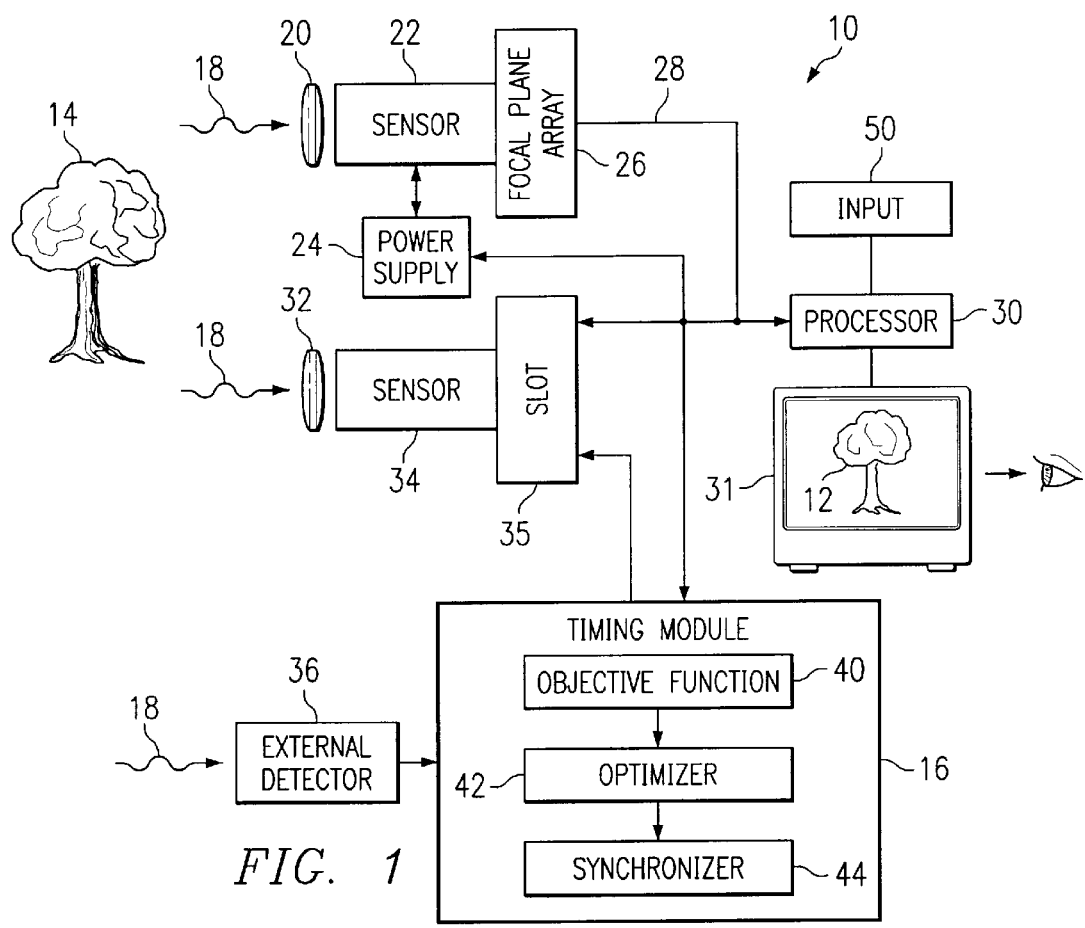
FIG. 1 is a block diagram of one embodiment of a system for generating an image of an object.
Figure 2:
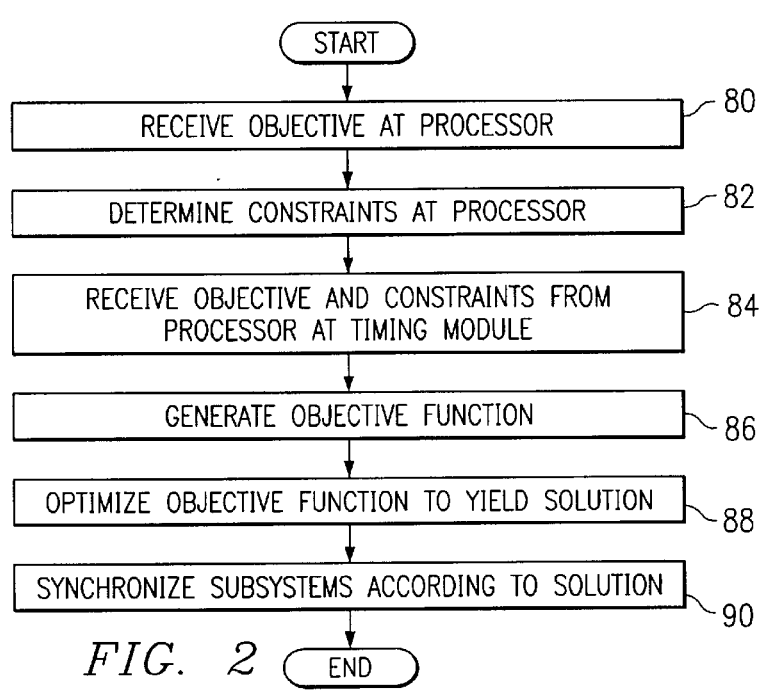
FIG. 2 is a flowchart demonstrating one embodiment of a method for generating an image of an object.

Embodiments of the present invention and its advantages are best understood by referring to FIGS. 1 and 2 of the drawings, like numerals being used for like and corresponding parts of the various drawings.

FIG. 1 is a block diagram illustrating one example of a system 10 for generating an image 12 of an object 14. System 10 includes a timing module 16 that synchronizes the subsystems of system 10 in order to generate image 12.

Light 18 reflected from object 14 includes information that may be used to generate image 12. Optics 20 may be used to direct light 18 to a sensor 22. Sensor 22 may comprise, for example, an image intensifier device that receives and intensifies light 18. Sensor 22 may comprise a photocathode and a microchannel plate. Light 18 incident on the photocathode causes photoelectrons to be emitted in proportion to the intensity of light 18, and the microchannel plate multiplies the photoelectrons to intensify the image.

A focal plane array 26 receives intensified electrons from sensor 22. Focal plane array 26 comprises an array of cells, each of which can process a portion of the received electrons to generate image information. The image information from a cell may be used to generate a pixel, a portion of a pixel, or a number of pixels of image 12. Focal plane array 26 sends image information to processor 30 through a system bus 28. A power supply 24 supplies power to sensor 22 and may comprise a source of electrical power such as a battery. Power supply 24 may be gated in order to prevent the photocathode from saturating. Sensor 22 collects light when the gate signal is active and does not collect light when the gate signal is not active.

Optics 32 may be used to direct light 18 toward a detachable sensor 34 received by a slot 35. Detachable sensor 34 may comprise, for example, an infrared sensor. Slot 35 may be able to receive any of a number of detachable sensors, such that a detachable sensor other than detachable sensor 34 may be inserted in slot 35. Slot 35 may allow for a variety of sensors to be used with system 10 or may allow for ready replacement of old sensors. Detachable sensor 34 sends image information to processor 30 via system bus 28. An external detector 36 detects light 18. External sensor 36 may comprise a detector that detects a specific wavelength range of light, for example, infrared.

Each subsystem may include an internal clock. For example, an internal clock of focal plane array 26 controls each cell's exposure to the electrons, processing of the electrons, and output of image information to system bus 28. As used in this document, "each" refers to each member of a set or each member of a subset of the set. An internal clock of detachable sensor 34 controls exposure to light 18, processing of image information, and output of image information to system bus 28.

Subsystems may be synchronized by optimizing an objective subject to constraints. An objective may describe a feature of image 12 such as image quality or brightness. An objective may also describe the operation of system 10 such as the power consumption of the subsystems.

Constraints may restrict the operation of the subsystems. Constraints may describe any suitable features or restrictions of the subsystems. For example, the constraints of power supply 24 that is gated may include the repetition rate of the gate, rise time of the gate, and reset time of the gate. A constraint of detachable sensor 34 may describe whether detachable sensor 34 has an external reset capability. Focal plane array 26 may have constraints describing the number of horizontal pixels, number of vertical pixels, clock frequency, and dynamic range. Constraints describing processor 30 may include the maximum speed of processing. Display 31 may have a constraint describing an image refresh value.

According to one embodiment, a subsystem may have an internal clock that cannot be externally controlled, which may require other subsystems to be synchronized to that internal clock. For example, detachable sensor 34 may have an internal clock that cannot be externally controlled. The rest of the subsystems may be required to be synchronized to detachable sensor 34.

Processor 30 receives image information from sensors 22 and 34 and generates image data from the received information. The image data may be used by a display 31 to generate image 12 of object 14. Processor 30 determines an objective that is optimized to synchronize the subsystems of system 10 and constraints that are used to constrain the optimization. The objective and constraints may be determined from user input through an input 50 or may be programmed into processor 30. Constraints may be determined by detecting a physical feature such as a pin configuration of detachable sensor 34 inserted in slot 35. Constraints may also be determined by detecting an analog or digital signal sent from a subsystem.

Timing module 16 includes an objective function module 40, an optimizer 42, and a synchronizer 44. Timing module 16 synchronizes subsystems of system 10, such as sensor 22, focal plane array 26, power supply 24, detachable sensor 34, processor 30, and external detector 36. Timing module 16 may synchronize any combination of subsystems of system 10.

Objective function module 40 receives an objective and constraints from processor 30 and image information from the subsystems. For example, external detector 36 may provide information about light 18. Objective function module 40 generates an objective function that may be optimized in order to achieve the objective subject to the constraints. This function may be generated using Boolean logic, neural network, or digital signal processor (DSP) procedures. The complexity of the procedure depends on the type of constraints and the degree of optimization.

The objective function may describe any suitable feature to be optimized. For example, the objective function may describe power consumption, and may be optimized to minimize the power consumption. Alternatively, the objective function may describe image quality, and may be optimized to maximize the image quality. Alternatively, the objective function may describe a laser light having a certain frequency, phase, and wavelength, and may be optimized to track the laser light using the laser light information. The objective function may comprise, for example, a function of time variables, each of which are associated with a subsystem that is to be synchronized. Optimizer 42 optimizes the objective function subject to the constraints in order to generate time values for the time variables. The time values describe how the subsystems may be synchronized.

Synchronizer 44 synchronizes the subsystems according to the time values of the optimized objective function. Synchronizer 44 may synchronize the subsystems using any suitable technique. The data from one subsystem may be delayed in order to be synchronized with another subsystem. For example, pixel data from detachable sensor 34 may be delayed in order to be synchronized with processor 30. The objective function can also be set to drop or delay no data, but to align (vin rate 1 phase) the data streatms for full output processing. Alternatively, the objective function may be set to align data streams by adjusting the rate and phase of the data streams, without dropping or delaying data, in order to allow for full output and processing. Alternatively, data from one subsystem may be ignored in order to synchronize the subsystem with another subsystem. For example, pixel data from detachable sensor 34 may be ignored in order to be synchronized with pixel data from sensor 22. Data from one subsystem may be combined in order to synchronize one subsystem with another subsystem. For example, pixel data from multiple pixels of sensor 22 may be combined in order to be synchronized with pixel data from a single pixel of detachable sensor 34.

System 10 may comprise software, hardware, or any suitable combination of software and hardware. Although system 10 is shown with the illustrated subsystems, system 10 may include any subsystems or configuration of subsystems suitable for generating image 12 of object 14.

FIG. 2 is a flowchart illustrating one example of a method for synchronizing subsystems of system 10. The method begins at step 80, where processor 30 receives an objective. The objective may be received through input 50 from a user, or may be programmed into processor 30. The objective may describe a feature of image 12 such as image quality or may describe the operation of system 10 such as power consumption. Constraints are determined by processor 30 at step 82. The constraints may describe features and restrictions of the subsystems of system 10. The constraints may be programmed into processor 30. Constraints may be also determined by identifying a detachable sensor 34 coupled to slot 35 and determining the constraints for detachable sensor 34. The objective and the constraints are transmitted to timing module 16 at step 84.

Objective function module 40 generates an objective function that may be used to optimize the objective. For example, the objective function may describe image quality and may be optimized to maximize the image quality. The objective function may comprise a function of time variables, where each time variable is associated with a subsystem of system 10. Optimizer 42 optimizes the objective function subject to the constraints to yield a solution at step 88. The solution may comprise time values for the time variables. Synchronizer 44 synchronizes the subsystems according to the solution at step 90. Synchronizer 44 may use the time variables to determine how to synchronize the subsystems. After synchronizing the subsystems, the method terminates.

Certain embodiments of the invention may provide technical advantages. A technical advantage of one embodiment is a timing module that synchronizes subsystems of an electro-optical device. The timing module optimizes a selected objective function to synchronize the subsystems. Consequently, the timing module may optimize a feature of the electro-optical device while synchronizing the subsystems.

Although an embodiment of the invention and its advantages are described in detail, a person skilled in the art could make various alterations, additions, and omissions without departing from the spirit and scope of the present invention as defined by the appended claims.

What is claimed is:

1. A system for synchronizing a plurality of subsystems, comprising:
   a processor operable to determine an objective and one or more constraints, the one or more constraints describing a plurality of subsystems comprising at least one sensor; and
   a timing module coupled to the processor and operable to:
   receive the objective and the one or more constraints from the processor;
   determine an objective function in response to the objective, the objective function comprising a function of a plurality of time variables, a time variable being associated with a subsystem;
   optimize the objective function in accordance with the one or more constraints to determine a time value for each time variable; and synchronize the subsystems according to the time values, the processor operable to receive data from the synchronized subsystems and generate an image from the data.

2. The system of claim 1, further comprising an electro-optical system comprising the timing module, the processor, and the subsystems, the electro-optical system operable to receive a first sensor or a second sensor as a received sensor, the processor operable to determine at least one of the one or more constraints in response to the received sensor.

3. The system of claim 1, wherein the objective function describes a quality of the image.

4. The system of claim 1, wherein the objective function describes a power consumption associated with generating the image.

5. The system of claim 1, wherein the timing module is operable to synchronize the subsystems by ignoring data from a first sensor to synchronize the first sensor with a second sensor.

6. The system of claim 1, wherein the timing module is operable to synchronize the subsystems by delaying data from a first sensor to synchronize the first sensor with a second sensor.

7. The system of claim 1, wherein the timing module is operable to synchronize the subsystems by combining data from a first sensor to synchronize the first sensor with a second sensor.

8. The system of claim 1, further comprising an image intensifier system comprising the timing module, the processor, and the subsystems.

9. The system of claim 1, wherein at least one of the subsystems is selected from a group consisting of a gated power supply, an infrared sensor, an image intensifier, and a focal plane array.

10. A method for synchronizing a plurality of subsystems, comprising:
receiving an objective and one or more constraints at a timing module from a processor, the one or more constraints describing a plurality of subsystems comprising at least one sensor;
determining an objective function in response to the objective, the objective function comprising a function of a plurality of time variables, a time variable being associated with a subsystem;
optimizing the objective function in accordance with the one or more constraints to determine a time value for each time variable;
synchronizing the subsystems according to the time values;
receiving data from the synchronized subsystems at the processor; and
generating an image from the data.

11. The method of claim 10, further comprising:
receiving a first sensor or a second sensor as a received sensor at an electro-optical system comprising the timing module, the processor, and the subsystems; and
determining at least one of the one or more constraints in response to the received sensor.

12. The method of claim 10, wherein the objective function describes a quality of the image.

13. The method of claim 10, wherein the objective function describes a power consumption associated with generating the image.

14. The method of claim 10, wherein synchronizing the subsystems comprises ignoring data from a first sensor to synchronize the first sensor with a second sensor.

15. The method of claim 10, wherein synchronizing the subsystems comprises delaying data from a first sensor to synchronize the first sensor with a second sensor.

16. The method of claim 10, wherein synchronizing the subsystems comprises combining data from a first sensor to synchronize the first sensor with a second sensor.

17. The method of claim 10, further comprising receiving the data at an image intensifier system comprising the timing module, the processor, and the subsystems.

18. The method of claim 10, wherein at least one of the subsystems is selected from a group consisting of a gated power supply, an infrared sensor, an image intensifier, and a focal plane array.

19. A method for synchronizing a plurality of subsystems, comprising:
means for receiving an objective and one or more constraints at a timing module from a processor, the one or more constraints describing a plurality of subsystems comprising at least one sensor;
means for determining an objective function in accordance with the objective, the objective function comprising a function of a plurality of time variables, a time variable being associated with a subsystem;
means for optimizing the objective function in accordance with the one or more constraints to determine a time value for each time variable;
means for synchronizing the subsystems according to the time values;
means for receiving data from the synchronized subsystems at the processor; and
means for generating an image from the data.

20. A system for synchronizing a plurality of subsystems, comprising:
a processor operable to determine an objective and one or more constraints, the one or more constraints describing a plurality of subsystems comprising a gated power supply, an infrared sensor, an image intensifier, and a focal plane array;
a timing module coupled to the processor and operable to:
receive the objective and the one or more constraints from the processor;
determine an objective function in response to the objective, the objective function comprising a function of a plurality of time variables, a time variable being associated with a subsystem, the objective function describing a power consumption associated with generating the image;
optimize the objective function in accordance with the one or more constraints to determine a time value for each time variable; and
synchronize the subsystems according to the time values by ignoring data from a first sensor to synchronize the first sensor with a second sensor, delaying data from the first sensor to synchronize the first sensor with the second sensor, and combining data from the first sensor to synchronize the first sensor with the second sensor; and
an electro-optical system comprising the timing module, the processor, and the subsystems, the electro-optical system operable to receive a first detachable sensor or a second detachable sensor as a received sensor, the processor operable to determine at least one of the one or more constraints in response to the received sensor, the processor operable to receive data from the synchronized subsystems and generate an image from the data.

* * * * *

UNITED STATES PATENT AND TRADEMARK OFFICE
CERTIFICATE OF CORRECTION

PATENT NO. : 6,760,062 B2
DATED : July 6, 2004
INVENTOR(S) : Ostromek et al.

It is certified that error appears in the above-identified patent and that said Letters Patent is hereby corrected as shown below:

Title page,
Item [*] Notice, should read -- Under 37 USC 154(b), the term of this patent shall be adjusted for 216 days. --.

Signed and Sealed this

Sixth Day of December, 2005

JON W. DUDAS
*Director of the United States Patent and Trademark Office*